(12) United States Patent
Rana

(10) Patent No.: US 11,986,007 B2
(45) Date of Patent: May 21, 2024

(54) COOKING PROCESS

(71) Applicant: PASTIFICIO RANA S.P.A., San Giovanni Lupatoto (IT)

(72) Inventor: Gian Luca Rana, San Giovanni Lupatoto (IT)

(73) Assignee: PASTIFICIO RANA S.P.A. (IT)

( * ) Notice: Subject to any disclaimer, the term of this patent is extended or adjusted under 35 U.S.C. 154(b) by 564 days.

(21) Appl. No.: 17/048,838

(22) PCT Filed: Apr. 24, 2019

(86) PCT No.: PCT/IB2019/053388
§ 371 (c)(1),
(2) Date: Oct. 19, 2020

(87) PCT Pub. No.: WO2019/207508
PCT Pub. Date: Oct. 31, 2019

(65) Prior Publication Data
US 2021/0235732 A1 Aug. 5, 2021

(30) Foreign Application Priority Data
Apr. 24, 2018 (IT) .................. 102018000004840

(51) Int. Cl.
*A23L 7/109* (2016.01)
*A47J 27/18* (2006.01)
(Continued)

(52) U.S. Cl.
CPC ............... *A23L 7/111* (2016.08); *A47J 27/18* (2013.01); *A23V 2300/38* (2013.01);
(Continued)

(58) Field of Classification Search
CPC ...... A23L 7/109–113; A23L 5/13; A23L 5/17; A47J 27/04; A47J 27/16; A47J 27/18;
(Continued)

(56) References Cited

U.S. PATENT DOCUMENTS

| 4,160,445 A | * | 7/1979 | Kunz | A47J 27/16 134/120 |
| 4,181,746 A | * | 1/1980 | Shin | A23L 7/109 426/511 |

(Continued)

FOREIGN PATENT DOCUMENTS

| CN | 1345185 A | 4/2002 |
| CN | 106388562 A | 2/2017 |

(Continued)

OTHER PUBLICATIONS

What Lisa Cooks; "A Quick and Easy Way to Cook Pasta"; Mar. 22, 2016; https://web.archive.org/web/20160731111432/https://www.whatlisacooks.com/blog/2016/3/22/a-quick-and-easy-way-to-cook-past (Year: 2016).*

(Continued)

*Primary Examiner* — Drew E Becker
*Assistant Examiner* — Austin Parker Taylor
(74) *Attorney, Agent, or Firm* — The Belles Group, P.C.

(57) ABSTRACT

A cooking procedure to cook pasta; the procedure comprises a water feeding step. During which a given quantity of liquid water at a temperature of at least 50° C. is fed to a container; and a vapour feeding step, during which a given quantity of water vapour is fed to the container containing a given quantity of pasta for an amount of time ranging from 7 to 40 seconds; the vapour feeding step is at least partially simultaneous with or subsequent to the water feeding step.

20 Claims, 2 Drawing Sheets

(51) Int. Cl.
*A47J 27/00* (2006.01)
*A47J 27/04* (2006.01)
*A47J 27/16* (2006.01)
*A47J 36/32* (2006.01)

(52) U.S. Cl.
CPC .... *A47J 2027/008* (2013.01); *A47J 2027/043* (2013.01); *A47J 27/16* (2013.01); *A47J 36/32* (2013.01)

(58) Field of Classification Search
CPC ............... A47J 27/026; A47J 2027/006; A47J 2027/008; A47J 2027/043; A47J 36/32
USPC ........................................................ 426/557
See application file for complete search history.

(56) References Cited

U.S. PATENT DOCUMENTS

| | | | | |
|---|---|---|---|---|
| 4,597,976 A * | 7/1986 | Doster | ................. | A23L 7/111 |
| | | | | 426/325 |
| 4,659,576 A * | 4/1987 | Dahle | ................. | A23L 7/111 |
| | | | | 426/331 |
| 4,734,291 A * | 3/1988 | Raffensperger | ........... | A23L 3/10 |
| | | | | 426/325 |
| 4,803,916 A | 2/1989 | Tacconi | | |
| 4,869,160 A | 9/1989 | Pratolongo | | |
| 5,573,804 A * | 11/1996 | Hsu | ................. | A23L 7/111 |
| | | | | 426/549 |
| 5,972,407 A | 10/1999 | Hsu | | |
| 6,036,987 A * | 3/2000 | Fukuyama | ............. | A23L 7/111 |
| | | | | 426/549 |
| 6,307,193 B1 | 10/2001 | Toole | | |
| 6,487,962 B1 | 12/2002 | Horn | | |
| 2002/0178932 A1 | 12/2002 | Cai | | |
| 2003/0051606 A1* | 3/2003 | Cusenza | ................. | A47J 27/18 |
| | | | | 99/357 |
| 2010/0151092 A1 | 6/2010 | Sus et al. | | |
| 2014/0290500 A1 | 10/2014 | Wurdinger et al. | | |
| 2016/0220058 A1* | 8/2016 | Rocklinger | ............... | A23L 5/13 |
| 2016/0302606 A1 | 10/2016 | Kallos et al. | | |

FOREIGN PATENT DOCUMENTS

| | | | | |
|---|---|---|---|---|
| EP | 0258374 A1 | 3/1988 | | |
| EP | 0273323 | 7/1988 | | |
| EP | 0273323 A2 * | 7/1988 | | |
| EP | 1164868 | 1/2002 | | |
| EP | 2606776 A1 | 6/2013 | | |
| EP | 2762045 | 8/2014 | | |
| EP | 2762045 A1 | 8/2014 | | |
| IT | VR910031 A1 | 10/1992 | | |
| JP | S6094066 | 5/1985 | | |
| JP | S6094066 A | 5/1985 | | |
| JP | S6257528 | 3/1987 | | |
| JP | S6257528 A | 3/1987 | | |
| JP | 63503115 | 11/1988 | | |
| JP | S63503115 A | 11/1988 | | |
| JP | H03198756 | 8/1991 | | |
| JP | H03198756 A | 8/1991 | | |
| JP | 07-087915 A | 4/1995 | | |
| JP | H0787915 A * | 4/1995 | | |
| JP | 2002539808 | 11/2002 | | |
| JP | 2002539808 A | 11/2002 | | |
| JP | 2005151969 A * | 6/2005 | .............. | A23L 7/111 |
| JP | 2015092836 A * | 5/2015 | | |
| WO | WO 87/04910 | 8/1987 | | |
| WO | 0057722 A1 | 10/2000 | | |
| WO | WO-0137679 A1 * | 5/2001 | ........... | A23L 1/1613 |
| WO | 0228240 A2 | 4/2002 | | |
| WO | WO 02/28240 | 4/2002 | | |

OTHER PUBLICATIONS

Chinese Office Action 2019800281449, dated Jan. 18, 2023.
PCT International Search Report and Written Opinion issued by the International Bureau of PCT Application No. PCT/IB2019/053388, dated Apr. 24, 2019, pp. 1-17.

* cited by examiner

COOKING PROCESS

CROSS-REFERENCE TO RELATED PATENT APPLICATIONS

The present application is a U.S. national stage application under 35 U.S.C. § 371 of PCT Application No. PCT/IB2019/053388, filed Apr. 24, 2019, which claims priority to Italian Patent Application No. 102018000004840, filed Apr. 24, 2018. The disclosures of the aforementioned priority applications are incorporated herein by reference in their entireties.

TECHNICAL FIELD

The invention relates to a cooking process to cook pasta.

CONTEXT OF THE INVENTION

In the catering industry (for example, restaurants and diners), operators usually have a given quantity of at least partially pre-cooked pasta available and complete the cooking thereof or heat it in boiling water after having received a customer's order.

Even though this reduces customers' waiting times to only a few minutes, the organoleptic, nutritional and hygienic properties of the served product cannot be compared to the organoleptic, nutritional and hygienic properties of a product completely cooked when the order is received. To this regard, it should be pointed out that the cooking finishing (or heating) step is often carried out always using the same water.

Furthermore, the cooking of the type described above requires a complicated apparatus (for example, boilers and exhaust hoods), which is significantly large and expensive.

In any case, even with this technique, food preparation times (which usually are much longer than two minutes) certainly are not ideal.

The object of the invention is to provide a cooking process, which is conceived so as to at least partially overcome the drawbacks of the prior art and, at the same time, is easy and economic to be implemented.

SUMMARY

According to the invention, there is provided a cooking process according to the appended independent claim and, preferably, to any one of the claims that directly or indirectly depend on said independent claim.

BRIEF DESCRIPTION OF THE FIGURES

The invention will now be described with reference to the accompanying drawings, which show non-limiting embodiments thereof, wherein.

DETAILED DESCRIPTION

Figure 3:
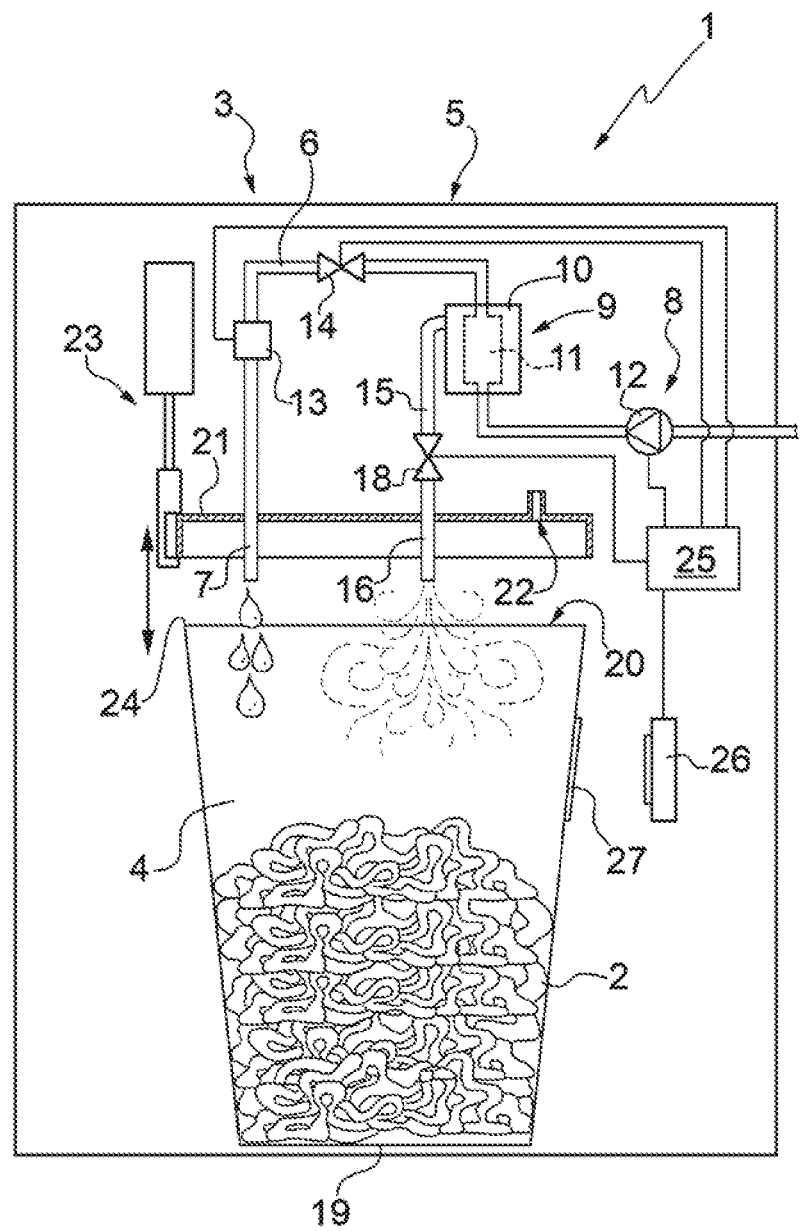
FIG. 3 schematically shows a machine to implement a method according to the invention.

In FIG. 3, number 1 indicates, as a whole, a machine to cook (fresh) pasta 2. The machine 1 comprises a device 3 to feed liquid water to a container 4 (containing the pasta 2) and a device 5 to feed water vapour to the container 4. In particular, the device 3 is configured to feed hot water, more precisely water at a temperature of at least approximately 50° C. (even more precisely, at least 60° C.)

In use, the combined action of the device 3 to feed liquid water and of the device 5 to feed water vapour leads to a quick and homogeneous cooking of the pasta 2.

In particular, the device 3 acts like a measuring device to feed a given quantity of liquid water at a temperature of at least 50° C. to the container 4; the device 5 acts like a measuring device to feed a given quantity of water vapour to the container 4; and the container 4 is configured to contain a given quantity of pasta 2.

According to an aspect of the invention, there is provided a system to cook pasta 2 comprising the devices 3 and 5 and the container 4.

According to some non-limiting embodiments, the container 4 is part of the machine 1. Advantageously, though not necessarily, the container 4 is separable (and separate) from the machine 1. More precisely, in use, the container 4 is changed every time the machine 1 is used. For example, the container 4 can be a disposable container. In some cases, the container 4 is made of a compostable material and/or has at least one transparent portion, so that the pasta 2 contained in it can be visible.

According to some non-limiting embodiments, the device 3 comprises a duct 6, a nozzle 7 arranged at an end of the duct 6 so as to release water into the container 4 and a feeding assembly 8 to convey the water along the duct 6 to the nozzle 7.

In particular, the device 3 also comprises a heating assembly 9, which is configured to heat the water emitted by the nozzle 7. More precisely, the heating assembly 9 comprises a boiler 10 and a heat exchanger 11 arranged inside the boiler 10.

In some cases, the boiler 10 is provided with a heater (which is known per se and is not shown herein—for example, an electrical resistance) to heat the water present inside the boiler 10 and cause it to evaporate.

According to some non-limiting embodiments, the feeding assembly 8 comprises a pump 12 and, advantageously, though not necessarily, a flow-meter 13 to measure the quantity of water flowing through the duct 6. In some cases, the feeding assembly 8 also comprises a flow adjuster 14 (in particular, a valve) to adjust (in a more precise manner) the quantity of water flowing along the duct 6 (and, hence, emitted by the nozzle 7).

According to some non-limiting embodiments, the device 5 comprises a duct 15, a nozzle 16 arranged at an end of the duct 15 so as to emit the water vapour and the boiler 10 to feed water vapour along the duct 15 to the nozzle 16. Advantageously, though not necessarily, the boiler 10 of the device 5 is the same of the device 3 (in this way, manufacturers can save money and space). Alternatively, the devices 3 and 5 comprise different boilers.

Advantageously, though not necessarily, the device 5 comprises a flow adjuster 18 (in particular, a valve) to adjust the water vapour emitted by the nozzle 16 (more precisely, the quantity of vapour flowing along duct 15 and, hence, emitted by the nozzle 16).

In particular, the container 4 comprises a base wall 19 and a (sole) opening 20 (opposite the base wall 19).

Advantageously, though not necessarily, the machine 1 comprises a lid 21, which is configured to (at least) partially cover the opening 20.

In some cases (like the one shown herein), the lid 21 completely covers the opening 20 and has a (sole) outlet passage 22, which establishes a communication between the inside of the container 4 and the outside. In particular, the area of the cross section of the outlet passage 22 ranges from approximately 0.09 cm² to approximately 0.95 cm².

According to some non-limiting embodiments, the lid 21 is provided (in the area of the outlet passage 22) with control means (for example, a relief valve) configured to let out gas from the inside of the container 4 when the pressure inside the container 4 exceeds a reference value.

More precisely, though not necessarily, the devices 3 and 5 (even more precisely, the nozzles 7 and 16) extend through the lid 21.

Advantageously, though not necessarily, the machine 1 comprises a moving device 23 (in particular, at least one fluid-dynamic actuator) to move at least one between the container 4 and the lid 21 relative to the other one (so as to move them close to and away from one another).

In the embodiment shown in FIG. 3, the moving device 23 is connected to and configured to move the lid 21. According to further embodiments, which are not shown herein, the moving device 23 is configured to move the container 4 towards the lid 21 or away from the lid 21.

In particular, the moving device 23 is configured to exert a given force (upon the lid 21 and/or upon the container 4) so as to keep the lid 21 in contact with an upper edge 24 of the container 4 (even when the device 5 is operated). More precisely, by so doing, a certain seal between the edge 24 and the lid 21 is obtained (thus, limiting the possibility of gas flowing out).

As an alternative or in addition, retaining means are provided, which limit the relative movement of the lid 21 and of the container 4 once the lid 21 comes into contact with the edge 24.

The machine 1 (in particular, the system to cook pasta 2) also comprises a control unit 25 to control the operation of the device 3 and of the device 5.

More precisely, the control unit 25 (which—at least partly—is a component of the device 3) is configured to control the flow adjuster 14 (and, if necessary, the pump 12), in particular depending on the data detected by the flowmeter 13.

As an alternative or in addition, the control unit 25 (which—at least partly—is a component of the device 5) is configured to control the flow adjuster 18.

According to some non-limiting embodiments, the control unit 25 is configured to (also) control the moving device 23.

Advantageously, though not necessarily, the machine 1 also comprises a reader 26, which is configured to a detect a code applied to the container 4. This code typically is a code identifying the pasta 2 contained in the container 4 and/or the operating parameters of the devices 3 and 5 (for example, quantity of water and/or duration of the operation of the device 5) which must be used to cook said pasta 2.

According to different non-limiting embodiments, the code can be available in the form of a barcode 27 and/or recorded in a (RFID) transponder 27 applied to the container 4.

In particular, the control unit 25 is configured to control the devices 3 and 5 depending on the data detected by the reader 26.

Figure 2:
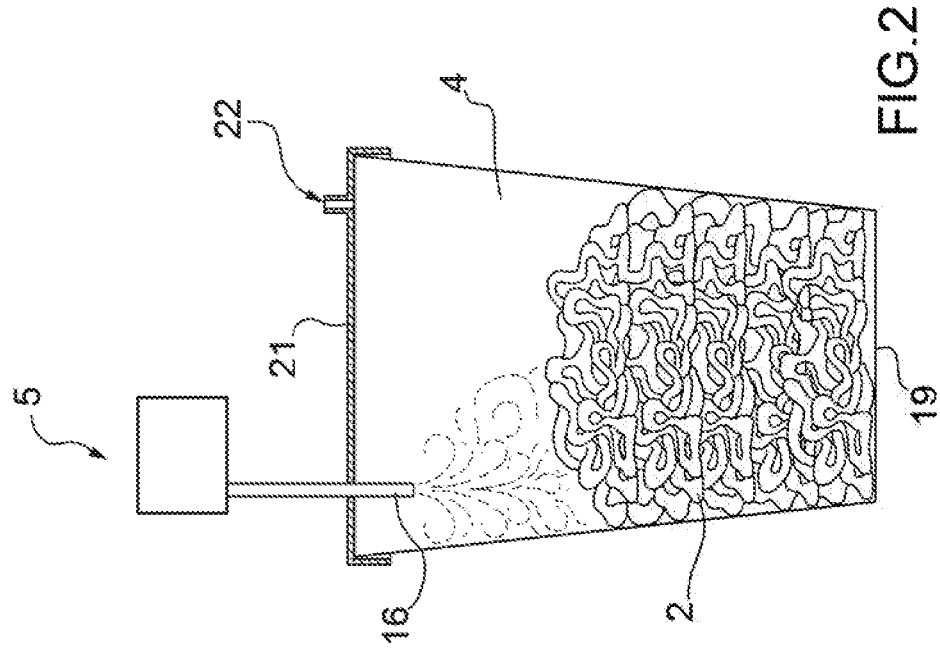
FIG. 2 shows a further step of the method according to the invention.
Figure 1:
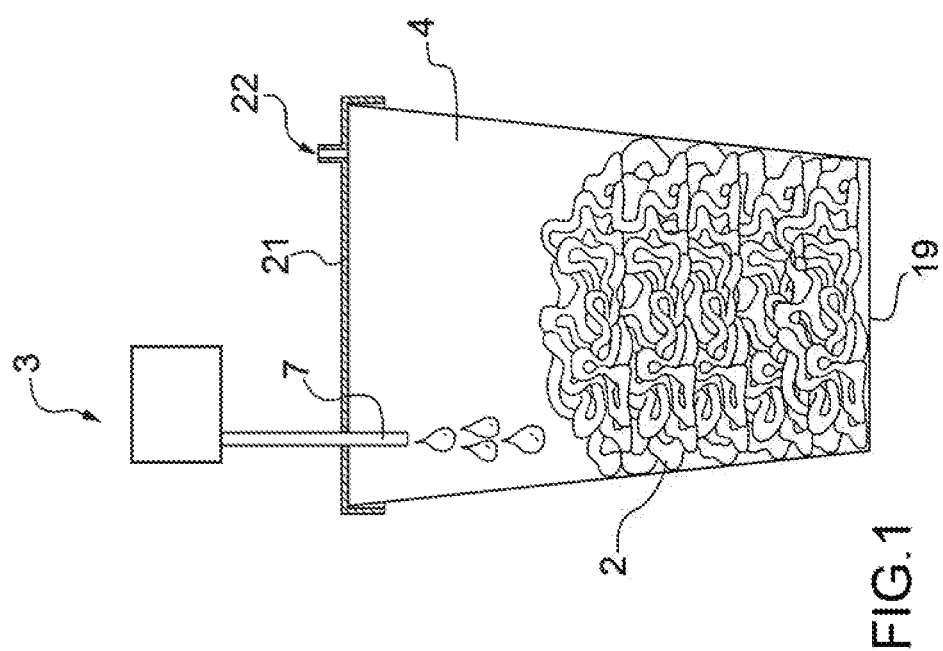
FIG. 1 shows a step of a method according to the invention.

In accordance with an aspect of the invention, there is also provided a cooking process to cook pasta 2. The process comprises a water feeding step (FIG. 1), during which a given quantity of liquid water is fed to a container 4 (as defined above); and a vapour feeding step (FIG. 2), during which a given quantity of water vapour is fed to the container 4 containing a given quantity of pasta 2 for an amount of time ranging from approximately 7 to approximately 50 seconds (in particular, from 10 to 35 seconds).

It should be pointed out that the use of vapour surprisingly allows user to cook the pasta 2 in a simple and quick fashion.

Advantageously, though not necessarily, during the water feeding step, the given quantity of liquid water is fed to the container 4 at a temperature of at least 50° C. (in particular, at least approximately 55° C.; more in particular, up to approximately 80° C.; even more in particular, up to approximately 90° C.). Please, note that, in this text, the expression "at least" followed by a given number indicates a number that is greater than or equal to said given number; furthermore, the expression "up to" followed by a further given number indicates a number that is smaller than or equal to said further given number.

According to some non-limiting embodiments, the vapour feeding step is at least partially simultaneous with or subsequent to the water feeding step. In other words, in some cases, the vapour feeding step takes place during part of or the entire water feeding step; in addition or as an alternative, the vapour feeding step takes place after the water feeding step; alternatively, the water feeding step takes place during part of the vapour feeding step. In other words, again, the vapour feeding step is (at least partially) simultaneous with and/or subsequent to the water feeding step.

In particular, during the vapour feeding step, at least part of the (the) given quantity of water vapour (directly) comes into contact with at least part of the (with the) given quantity of pasta 2 (if necessary, already—completely or partly—wetted by the given quantity of water fed during the water feeding step).

In particular, during at least part of the (during the) vapour feeding step, the pasta 2 is not (completely) immersed in water.

Advantageously, though not necessarily, the process implemented by the machine 1 described above.

Thanks to the combined action of the water and of the vapour, the cooking times are significantly reduced relative to the previous ones. Furthermore, the process can be implemented by a machine 1 that is relatively small and cheap.

The pasta 2 (before the vapour feeding step and, in particular, before the water feeding step) present (or inserted) inside the container 4 is substantially raw (it was not subjected to a pre-cooking step).

In particular, during the vapour feeding step, the given quantity of water vapour is fed to the container 4 so as to cook the pasta 2 contained therein.

More precisely, the given quantities of liquid water, water vapour and (fresh) pasta 2 are selected in such a way that the pasta 2 is properly cooked, but, at the same time, a substantially irrelevant quantity of water is left in the container 4.

In particular, the pasta 2 has a humidity content of at least approximately 20% by weight relative to the total weight of the pasta 2. Advantageously, though not necessarily, the pasta 2 has a humidity content of at least approximately 22% (more precisely, at least approximately 24%), in particular up to approximately 40% (more precisely, up to approximately 35%), by weight relative to the total weight of the pasta.

The humidity percentages indicated above relate to the pasta 2 before the aforesaid process is implemented. In other words, the pasta 2 has a humidity content of at least 20% (advantageously, at least 22%; more precisely, at least approximately 24%; in particular, up to approximately 40%;

more in particular, up to approximately 35%) before the vapour feeding step (in particular, also before the water feeding step).

According to some non-limiting embodiments, the pasta 2 has a water activity (Aw) of at least approximately 0.85 (more precisely, at least approximately 0.89). In particular, the pasta 2 has a water activity (Aw) ranging from approximately 0.90 (more precisely, from 0.91) to approximately 0.98 (more precisely, to 0.97).

Alternatively, the pasta 2 has a water activity (Aw) up to approximately 0.91 (in particular, up to approximately 0.92). In particular (in these cases), the pasta 2 has a humidity content of at least approximately 20% (more precisely, at least approximately 22%) by weight relative to the total weight of the pasta. More in particular (in these cases), the pasta 2 has a humidity content up to 24% (more precisely, up to 23%) by weight relative to the total weight of the pasta.

By "weight of the pasta" or "total weight of the pasta" we mean the weight of the pasta (2) without considering possible further components (for example, the filling of filled pasta). Similarly, said humidity and/or water activity are considered only in relation to the pasta components, without taking into account possible further components (for example, the filling of filled pasta).

In this text, we consider the water activity (at 25° C.) measured according to the provisions set forth by standard ISO 18787:2017.

As it is known, the water activity is:

$$a_w = \frac{p_v}{P^*} \quad (1.1.1)$$

wherein:

$p_v$ is the vapour pressure of water inside the food (Pa)
$P^*$ is the vapour pressure of pure water at the same temperature (Pa).

The humidity percentage of the pasta 2 is measured by calculating (in accordance with what is deemed to be usual) the ratio between the difference between the weight of an initial sample and the weight of the same sample subjected to drying (after nor more weight variation can be observed any longer) and the weight of the initial sample. In particular, the humidity of the pasta is measured as provided for by ASTM C566.

According to some non-limiting embodiments, the container 4 comprises at least one opening 20, through which, during the vapour feeding step, (at least) part of the water vapour flows out of the container 4. More precisely, the container 4 is of the type described above.

Advantageously, though not necessarily, during the vapour feeding step, a lid 21 (in particular, of the type described above) at least partially covers the opening 20 in order to reduce the outlet of water vapour from the container 4.

According to some non-limiting embodiments, the lid 21 completely covers said opening and has an outlet passage, which establishes a communication between the inside of the container and the outside and, in particular, has an area ranging from approximately 0.09 cm² to approximately 0.95 cm².

In some cases, the lid 21 is provided (in the area of the outlet passage 22) with control means (for example, a relief valve), which let out gas from the inside of the container 4, during the vapour feeding step, when the pressure inside the container 4 exceeds a reference value.

Advantageously, though not necessarily, during at least part of the vapour feeding step, the pressure inside the container 4 is greater than atmospheric pressure, in particular it is greater than approximately 1 bar (more precisely, greater than approximately 1.001 bar), more in particular it is up to 1.2 bar.

Advantageously, though not necessarily, the water vapour has a vapour quality (namely, as it is known, the ratio between the vapour mass and the total mass of liquid plus vapour) smaller than approximately 0.9, in particular smaller than approximately 0.8.

According to some non-limiting embodiments, the given quantity of water is smaller, by weight, than the given quantity of pasta 2.

In particular, the ratio between the weight of the given quantity of water and the weight of the given quantity of pasta 2 ranges from approximately 0.30 to approximately 0.95, in particular from approximately 0.35 to approximately 0.90.

Advantageously, though not necessarily, the ratio between the weight of the given quantity of vapour and the given quantity of pasta 2 ranges from approximately 0.04 to approximately 0.25, in particular from approximately 0.06 to approximately 0.20.

Advantageously, though not necessarily, during the vapour feeding step, the vapour is fed to the container 4 at a pressure of approximately at least 1.5 bar, more in particular ranging from approximately 2.5 bar to approximately 4 bar.

According to some embodiments, during the water feeding step, a nozzle 7 (in particular, as defined above) feeds the given quantity of liquid water into the container 4. During the vapour feeding step, a nozzle 16 (in particular, as defined above) feeds the given quantity of water vapour into the container 4.

Advantageously, though not necessarily, the vapour feeding step is (at least partially) subsequent to the water feeding step.

In particular, during the water feeding step, the given quantity of liquid water is fed to the container 4 containing the given quantity of pasta 2. In these cases, preferably, though not necessarily, the pasta 2 is left in the liquid water, before the vapour feeding step, for an amount of time shorter than approximately 40 seconds (more precisely, shorter than approximately 30 seconds).

According to some embodiments, the process comprises an addition step, which is subsequent to the vapour feeding step and during which a sauce (for example a meat and/or vegetable sauce) is added to the pasta 2 (present in the container 4), which has already been subjected to the water feeding step and to the vapour feeding step.

In particular, the process also comprises a sauce heating step, which is prior to the addition step and during which the sauce is heated. Alternatively, the sauce can be added cold.

According to specific embodiments, the given quantity of pasta inside the container has a weight ranging from approximately 70 (in particular, from approximately 80) to approximately 150 (in particular, to approximately 120) grams; the given quantity of liquid water has a weight ranging from approximately 30 (in particular, from approximately 40) to approximately 130 (in particular, to approximately 90) grams; the given quantity of vapour has a weight raging from approximately 4 (in particular, from approximately 6) to approximately 25 (in particular, approximately 20) grams.

The quantities of pasta 2, water and vapour (more precisely, the relative ratios by weight, the ratio between the weight of the pasta 2 and the vapour dispensing time) and other parameters (such as, for example, the temperature of the water fed to the container 4 and/or the pressure at which the vapour is dispensed into the container 4) can be changed (adjusting them) based on the needs and depending on the different types of pasta 2 used.

Advantageously, though not necessarily, the pasta 2 has a thickness up to 3.5 mm, in particular up to 3 mm, more advantageously up to 2 mm, even more advantageously up to 1.5 mm.

According to some embodiments, the pasta 2 has a thickness of at least 0.3 mm, in particular of at least 0.4 mm, more in particular of at least 0.5 mm.

Advantageously, though not necessarily, the container 4 has a code (in particular, as defined above). The process also comprises a detection step, during which the code is detected, and a condition selection step, during which the parameters used during the liquid water feeding step and the water vapour feeding step are selected based on the detected code. In particular, during the condition selection step, at least one among the following parameters is selected: the given quantity of liquid water, the temperature of the liquid water, the given quantity of water vapour, the vapour dispensing pressure, the vapour quality, and the amount of time during which the water vapour is fed to the container (in other words, the time of duration of the vapour feeding step). More in particular, during the condition selection step, at least one among the following parameters is selected: the given quantity of liquid water, the given quantity of water vapour, and the amount of time during which the water vapour is fed to the container.

By implementing the process according to the invention, users can obtain different advantages compared to the prior art. Among them there are the following advantages: the pasta 2 can surprisingly be cooked in an extremely short time (the finished dish can typically be served in an amount of time that is significantly shorter than one minute from the beginning of the preparation), with a relatively small and cheap machine; the obtained cooked pasta has organoleptic, nutritional and hygienic properties that are absolutely comparable with (or even better than) the ones of the pasta cooked with the traditional method with one single step in boiling water (namely, without pre-cooking).

As far as the hygienic aspect is concerned, the possibility of using a different (clean and/or new) container 4 for each new serving of pasta is particularly advantageous.

Please, note that the process according to the invention can be used in public eateries (for example, restaurants, diners, etc.), furthermore reducing the need for large and expensive apparatuses (such as the typical exhaust hoods). In these cases, customers can select the pasta 2 they want, which will be cooked right there and then by the operator using a clean (new) container 4, where customers can also, if necessary, directly eat.

Furthermore, the process according to the invention can also be implemented at home, so as to simplify the preparation of meals and significantly reduce cooking times.

Further characteristics of the invention will be best understood upon perusal of the following description of a merely explanatory and non-limiting example.

Example 1

This example describes specific tests concerning the implementation of the process described above. Water at a temperature of 60° C. and, immediately after, vapour were fed to fresh pasta samples (humidity content of 24%—or more—relative to the weight of the pasta) indicated in table 1 below and arranged inside a container 4 (as described above). During the feeding of the vapour, the opening 20 of the container was completely closed by a lid 21 provided with an outlet opening 22 (with an area of approximately 0.2 cm$^2$)

A water feeding nozzle 7 and a vapour feeding nozzle 16 extended through the lid 21.

The quantity of water used and the vapour dispensing time of each test are indicated in table 1 (the millimetres shown therein identify the thickness of the pasta).

TABLE 1

| PASTA TYPE | PASTA (Gr) | VAPOUR (Sec) | WATER (Gr) |
|---|---|---|---|
| Tagliatelle | 100 | 15 | 82 |
| Fusilli | 100 | 15 | 82 |
| Spaghetti 1.8 mm | 100 | 15 | 82 |
| Tagliatelle | 100 | 25 | 82 |
| Cappelletti 0.45 mm | 100 | 15 | 41 |
| Spaghetti 1.6 mm | 100 | 35 | 82 |
| Fettuccine | 100 | 20 | 82 |
| Tagliatelle sfoglia grezza 0.85 mm | 100 | 10 | 82 |
| Cappelletti | 100 | 20 | 60 |

The obtained cooked pasta was blind-tested by a panel of three tasters compared to the same pasta cooked with a traditional method in boiling water in one single step (without pre-cooking). The panel was not able to distinguish (from the organoleptic point of view and from the point of view of the consistency) the pasta cooked with the two processes.

Tests under conditions similar to the ones described above were also carried out using dry pasta. The obtained pasta, in these cases, was not sufficiently cooked and basically non-edible.

The invention claimed is:

1. A process for cooking pasta with a moisture content of at least 20% by weight with respect to the weight of the pasta, the moisture content corresponding to the pasta before the process is implemented; the process comprises:
    a water feeding step, during which a given quantity of liquid water is fed to a container via a first nozzle; and
    a vapour feeding step, during which a given quantity of water vapour is fed via a second nozzle to the container containing a given quantity of pasta for an amount of time of at least 7 seconds;
    wherein the given quantity of water is smaller, by weight, than the given quantity of pasta and has a temperature of at least 50° C.

2. A process according to claim 1, wherein, during the vapour feeding step, a given quantity of water vapour is fed to the container containing a given quantity of pasta for an amount of time up to 50 seconds.

3. A process according to claim 1, wherein, during the vapour feeding step, a given quantity of water vapour is fed to the container containing a given quantity of pasta for an amount of time up to 40 seconds.

4. A process according to claim 1, wherein the container comprises at least one opening, through which, during the vapour feeding step, part of the water vapour flows out of the container.

5. A process according to claim 1, wherein, during at least part of the vapour feeding step, the pressure inside the container is greater than atmospheric pressure.

6. A process according to claim 1, wherein the water vapour has a vapour quality, which is the ratio between the vapour mass and the total mass of liquid plus vapour, smaller than 0.9.

7. A process according to claim 1, wherein the ratio between the weight of the given quantity of water and the given quantity of pasta ranges from 0.30 to 0.95.

8. A process according to claim 1, wherein the container has a base wall and an opening opposite the base wall; during the vapour feeding step, a lid at least partially covers said opening so as to reduce the outlet of water vapour from the container.

9. A process according to claim 8, wherein the lid completely covers said opening and has an outlet passage, which establishes a communication between the inside of the container and the outside and has an area ranging from 0.09 $cm^2$ to 0.95 $cm^2$.

10. A process according to claim 8, wherein the lid completely covers said opening and is provided with control means, which are configured to let out gas from the inside of the container when the pressure inside the container exceeds a reference value.

11. A process according to claim 1, wherein the vapour feeding step is subsequent to the water feeding step, during which the given quantity of liquid water is fed to the container containing the given quantity of pasta.

12. A process according to claim 1 and comprising an additional step, which is subsequent to the vapour feeding step and during which a sauce is added to the pasta, which has already been subjected to the water feeding step and to the vapour feeding step.

13. A process according to claim 1, wherein the pasta has a moisture content of at least 22% by weight with respect to the weight of the pasta, the moisture content corresponding to the pasta before the process is implemented.

14. A process according to claim 1, wherein the pasta has a water activity (Aw) ranging from 0.85 to 0.98; the pasta water activity relates to the pasta before the process is implemented.

15. A process according to claim 1, wherein the pasta has a water activity (Aw) up to 0.91; the pasta water activity relates to the pasta before the process is implemented.

16. A process according to claim 1, wherein the given quantity of pasta inside the container has a weight ranging from 70 to 150 grams; the given quantity of liquid water has a weight ranging from 30 to 130 grams; the given quantity of vapour has a weight ranging from 4 to 20 grams.

17. A process according to claim 1, wherein, during the water feeding step, the given quantity of liquid water is fed to the container containing the given quantity of pasta; the container having a code; the process further comprises a detection step, during which the code is detected, and a condition selection step, during which, based on the detected code, the parameters used during the liquid water feeding step and the water vapour feeding steps are selected; in particular, during the condition selection step, at least one of the following items is selected: the given quantity of liquid water, the given quantity of water vapour, and the time during which the water vapour is fed to the container.

18. A process according to claim 1, wherein the vapour feeding step is simultaneous with and/or subsequent to the water feeding step.

19. A process according to claim 1, said pasta has a moisture content of at least 24% by weight relative to the weight of the pasta, the moisture content corresponding to the pasta before the process is implemented.

20. A process according to claim 1, and implemented by a machine comprising a device to feed liquid water to said container, containing the pasta and a device to feed water vapour to the container; the combined action of the device to feed liquid water and of the device to feed water vapour leads to a cooking of the pasta.

* * * * *